(12) United States Patent
Bitel

(10) Patent No.: US 8,656,640 B2
(45) Date of Patent: Feb. 25, 2014

(54) TREE BALLING METHOD, SYSTEM, AND WIRE BASKET USED THEREIN

(76) Inventor: Harry J. Bitel, Emmett, MI (US)

(*) Notice: Subject to any disclaimer, the term of this patent is extended or adjusted under 35 U.S.C. 154(b) by 1486 days.

(21) Appl. No.: 11/836,377

(22) Filed: Aug. 9, 2007

(65) Prior Publication Data

US 2009/0038219 A1 Feb. 12, 2009

(51) Int. Cl.
*A01G 23/04* (2006.01)
*A01G 23/02* (2006.01)

(52) U.S. Cl.
USPC .................................................. 47/76; 47/73

(58) Field of Classification Search
USPC ............. 47/73, 76, 1.1 P; 111/100–104, 114; 37/302; 100/15; 140/80, 92.1, 92.2; 242/410, 430; 29/7; 180/89.11, 89.13
See application file for complete search history.

(56) References Cited

U.S. PATENT DOCUMENTS

| | | | |
|---|---|---|---|
| 357,197 A | 2/1887 | Harsin | |
| 621,405 A | 3/1889 | Garrett | |
| 835,585 A | 11/1906 | Uffmann | |
| 879,613 A | 2/1908 | Edwards | |
| 1,664,913 A * | 4/1928 | Bewley | 53/527 |
| 2,634,532 A | 11/1950 | Englert | |
| 2,573,770 A | 11/1951 | Meadow | |
| 2,707,846 A | 5/1955 | Beseler | |
| 2,763,454 A * | 9/1956 | Lindsell | 248/517 |
| 2,792,775 A * | 5/1957 | Beyette | 100/13 |
| 3,017,719 A * | 1/1962 | Schnellbacher et al. | 47/58.1 R |
| 3,032,368 A * | 5/1962 | Schnellbacher et al. | 410/31 |
| 3,161,989 A | 12/1964 | Sigler et al. | |
| 3,481,075 A | 12/1969 | Dastoli et al. | |
| 3,550,318 A | 12/1970 | Remke et al. | |
| 3,594,931 A * | 7/1971 | Yost | 111/101 |
| 3,715,095 A * | 2/1973 | Drablowski | 47/40.5 |
| 3,782,773 A * | 1/1974 | Mason | 296/3 |
| 3,814,239 A | 6/1974 | McGinley et al. | |
| 3,889,402 A * | 6/1975 | Wheeler et al. | 111/101 |
| 3,979,856 A | 9/1976 | Belcher | |
| 4,062,148 A | 12/1977 | Edmonds, Jr. et al. | |
| 4,170,097 A | 10/1979 | Floet et al. | |
| 4,250,664 A | 2/1981 | Remke | |
| 4,287,840 A | 9/1981 | Weidner | |
| 4,332,093 A | 6/1982 | Berthollet | |
| 4,341,025 A * | 7/1982 | Stocker | 111/101 |
| 4,372,351 A | 2/1983 | Myers | |
| 4,391,030 A | 7/1983 | Weidner | |
| 4,403,447 A | 9/1983 | Braun | |
| 4,478,260 A | 10/1984 | Eichler | |
| 4,570,423 A | 2/1986 | DeLong | |
| 4,625,662 A * | 12/1986 | Heinzen | 111/101 |
| 4,658,867 A * | 4/1987 | Hasak | 140/112 |
| D311,666 S | 10/1990 | Burke | |

(Continued)

*Primary Examiner* — Shadi Baniani
(74) *Attorney, Agent, or Firm* — Brooks Kushman P.C.

(57) ABSTRACT

A tree balling system automates the current tree balling method and greatly reduces strenuous physical labor. A novel wire basket having projections with hooks is provided for securing the earth ball of a plant for transplantation. Wrapping and tensioning a tensile member around these hooks encloses the projections around the earth ball. A balling station is also disclosed which has a stand for supporting and rotating the wire basket and plant. The balling station includes a tensile member guide and a tensioning component. The balling station is preferably located on a transportable vehicle and is equipped with unloading features for discharging the wrapped earth ball. A powered tensioning device tightens the wire basket around the earth ball. A hook forming device is also disclosed wherein the hook forming device can modify conventional wire baskets.

5 Claims, 6 Drawing Sheets

(56) References Cited

U.S. PATENT DOCUMENTS

| | | | |
|---|---|---|---|
| 4,979,321 A * | 12/1990 | Hall | 111/101 |
| 5,025,590 A | 6/1991 | Smith | |
| 5,090,157 A | 2/1992 | Sipala | |
| 5,368,353 A | 11/1994 | Flanders et al. | |
| 5,419,695 A | 5/1995 | Clegg | |
| 6,343,659 B1 | 2/2002 | Sexsmith | |
| 6,561,108 B2 | 5/2003 | Fisher | |
| 2003/0208957 A1 * | 11/2003 | Meurer | 47/73 |

* cited by examiner

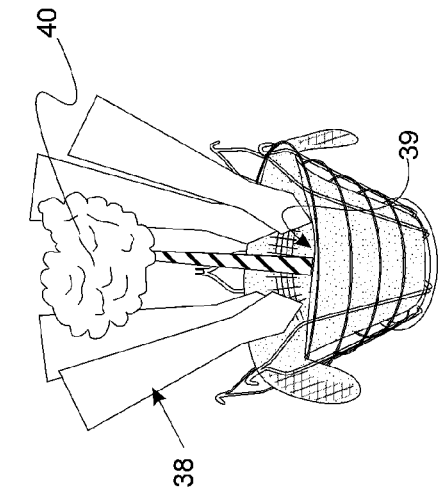
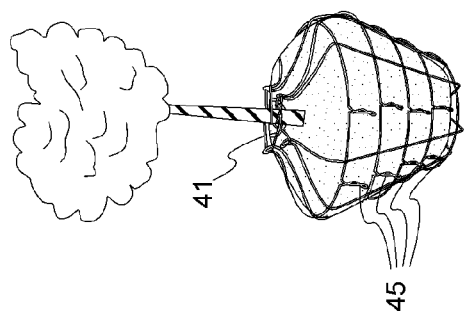
Fig. 1A  Fig. 1B  Fig. 1C
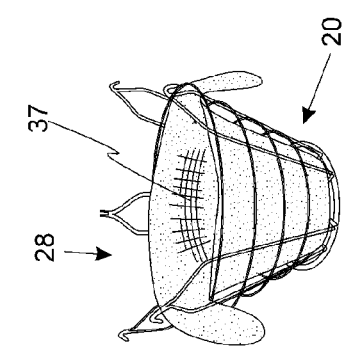
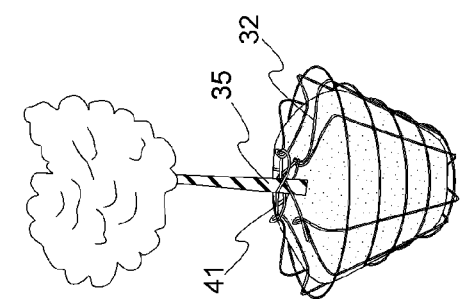
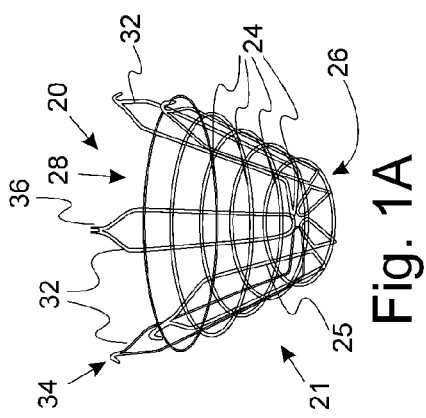
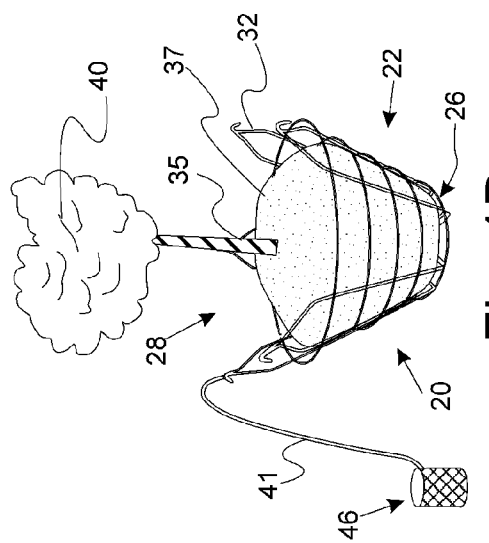
Fig. 1D  Fig. 1E  Fig. 1F

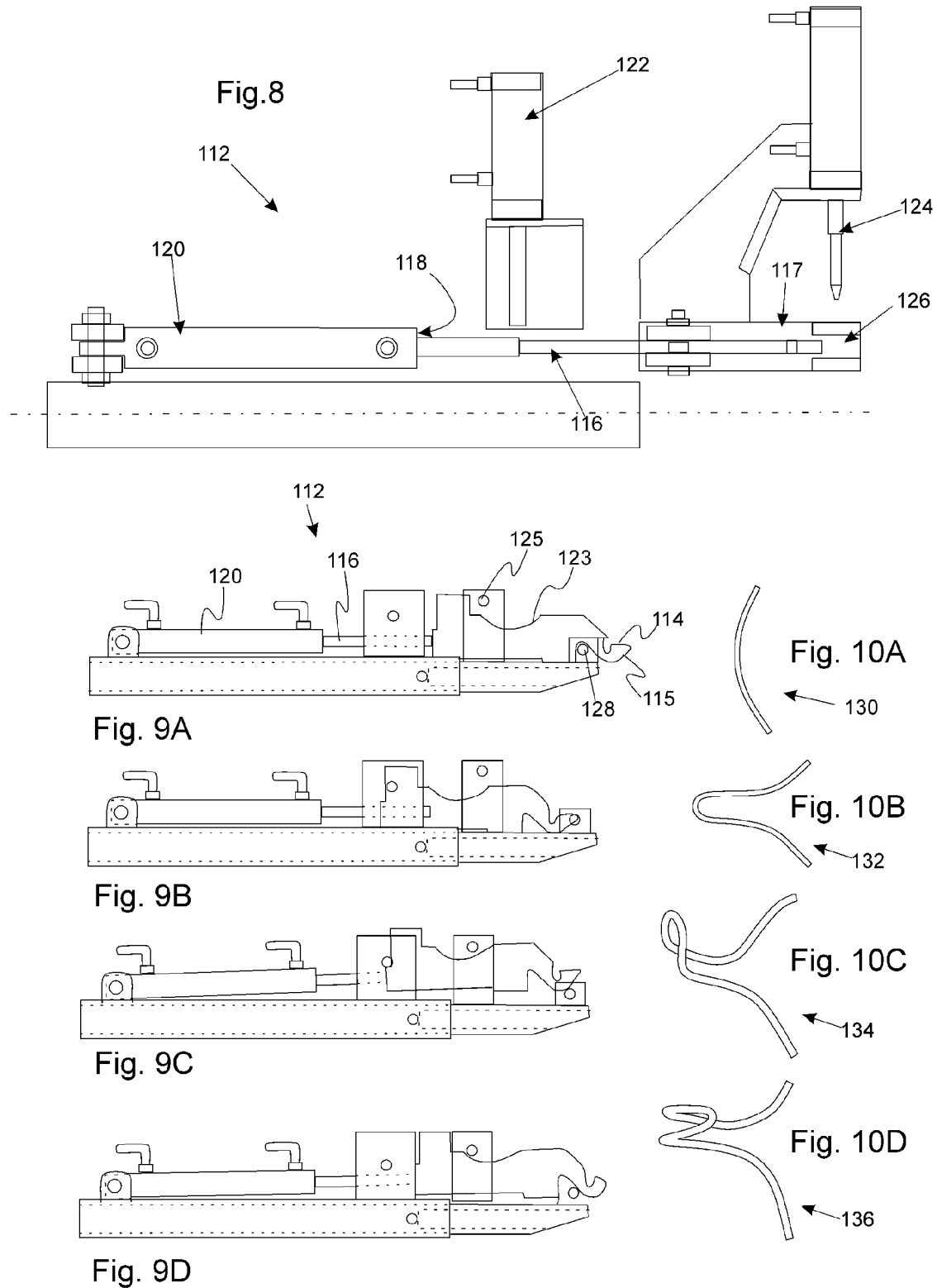

TREE BALLING METHOD, SYSTEM, AND WIRE BASKET USED THEREIN

BACKGROUND OF THE INVENTION

1. Field of the Invention

The current practice of tree balling is considerably strenuous and requires demanding labor. The present invention relates to a series of mechanisms forming a method hereby making the practice of preserving and transplanting any variety of plants more efficient and automated while eliminating most if not all of the most labor intensive work. More specifically, the invention relates to an improved wire basket for receiving and protecting the root system and earth ball of a plant, an integrated balling station for securing the wire basket around its contents, and an improved tensioning apparatus for additionally tightening the wire basket around the earth ball.

2. Background Art

Many methods and utilities exist for aiding the transplantation of a plant although a considerable lack of efficiency and automation remains. Burlap, a very simple and biodegradable wrapping, was an early choice for preserving the root system of a plant although it alone proved incompetent as its soft structure allowed for damaging cracks in the earth ball. A movement towards wire baskets lined with burlap is ever present today. Wire baskets on the market for protecting and keeping a plant's root system and earth ball intact during relocation are overly complex, insufficient, and impractical. U.S. Pat. Nos. 4,062,148 and 4,403,447 for example, require a time costly bottom to be tied on by hand, U.S. Pat. No. 5,368,353 lacks structural rigidity and can cause cracks in the root ball compromising the plant's future, and U.S. Pat. No. 5,025,590 has a complicated wire mesh and the need for rope to be thread by hand in order to secure the top of the basket.

Many overly complex wire baskets have trouble not only with cost effectiveness, but also the ability to take on the shape of the tree ball. This deficiency promotes cracked propagation and root damage within the wrapped earth ball. Still other existing wire baskets require that harnessing be done by hand or ratcheting on a T-bar mechanism. Securing the tops and tensioning the sides of these baskets require an extraordinary amount of manual labor and a large crew to spread the load.

Other attempts have been directed at machines digging the root ball and transporting the plant in itself. Considering U.S. Pat. No. 5,419,695 to Clegg, while this type of machine is reasonable for moving a small number of trees over a small distance, this proves rather cumbersome for larger operations such as a commercial nursery attempting to move numerous plants miles away.

A number of tree wrapping stations and assemblies exist although most remain technologically deprived and promote time consuming physical labor. U.S. Pat. No. 4,570,423 to DeLong is an example of a stationary holding device in which an earth ball has to be manually wrapped, secured, and prepared for shipment.

Accordingly, there is an inherent need to overcome the deficiencies in various tree balling equipment and processes to improve efficiency and reduce manual labor.

SUMMARY OF THE INVENTION

One aspect of the invention includes an open wire mesh basket for reception and preservation of a plant's root system. The basket, which can preferably be lined with burlap, features a series of projections protruding past the rim at the open end to entrap and secure the earth ball of a plant. These projections, connected and spaced about the rim, are characterized by outwardly facing looped wire hooks in which twine or rope is placed and put in tension, causing these projections and twine to enclose the basket top. The wire basket has sidewalls preferably tapered toward the bottom in order to promote nested stacking, and the projections are initially aligned with the sidewalls to avoid obstructing the open top of the basket.

Another aspect of the invention is a tree balling station featuring a stand which holds and supports the wire basket with and without the earth ball. The stand is positioned so the basket is generally vertical and ready to receive the earth ball. After receiving the earth ball, the stand is selectively rotated by a drive mechanism which provides the stationary operator, commonly in a chair, access to the entire basket. This rotation is ideal for the wrapping process in which burlap is folded around the earth ball and rope is placed around the hooks eventually forcing the projections to enclose the basket. A movable feeding arm adjacent to the operator supplies and maintains tension in the rope as it is distributed from a nearby container. The balling station also includes a tilt mechanism for moving the stand, the wire basket, and the entrapped earth ball between the initially upright position in an unload position by which the plant is rested on the earth. The stand has a plurality of adjustable supports extending from the surface which provide stability to the earth ball, the plant, and the wire basket during manipulation and disturbance.

Alternatively, the balling station can be onboard a transportable frame. This frame becomes very advantageous if it is a self propelled apparatus, adding maneuverability and flexibility. After the top of the basket is secured with the rope and projections, additional tensioning is desired to tighten the wire basket around the earth ball.

A further embodiment of the invention is a tensioning apparatus for this action. The tensioning apparatus includes a drive member, having a free end with a hook disposed thereon, a wire guide located adjacent to the hook, and a rotary driver for selectively rotating the drive member. There are two positions pertinent to this device, one being a retracted inboard position in which the hook is inboard of the wire guide, and the other being an extended outboard position in which the hook protrudes beyond the wire guide. A linear actuator is used to engage these two positions, moving the wire guide and the hook relative to one another. A segment of the wire basket to be tensioned is initially clasped and later released in the extended outboard position. A shift to the retracted inboard position draws wire away from the basket forming an elongated U-shaped loop of wire as the wire guide holds the basket in place. The rotary driver then rotates the drive member and hook causing for the wire segment to be twisted and essentially tied off. This closed segment of wire is then released through a reverse shift back to the original position in which the hook is protruding. This procedure causes the wire basket to tighten around its contents, promoting a successful transplantation.

Yet another variation of the invention is a hook forming mechanism to form lacing hooks given a loop of wire, the loop of wire commonly being a component of a wire basket. The apparatus is provided with a shaft, driven by an actuator, having a free end on which a grasping mechanism is disposed. The device also includes a die having a gap wherein the grasping mechanism grasps a segment of wire and draws it into the die forming an elongated loop. A lifting mechanism or angled surface working in combination with the actuator proceeds to raise the grasping mechanism and elongated loop up and around a removable pin which is placed in a slot adjacent to the gap. The removable pin is removed after deformation in order to release the newly formed hook.

Other aspects, features, and uses of the disclosed inventions will become apparent to one skilled in the art from a study of the following description and associated drawings.

BRIEF DESCRIPTION OF THE DRAWINGS

FIGS. 1A-1F show sequential steps for utilizing the novel wire basket to preserve the earth ball of a plant;

FIG. 8 shows a top view of the hook forming apparatus;

FIGS. 9A-9D show a series of side views of the hook forming apparatus during formation; and FIGS. 10A-10D show the stages of the hook during the hook forming process.

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to utilize the present invention.

Figure 2:
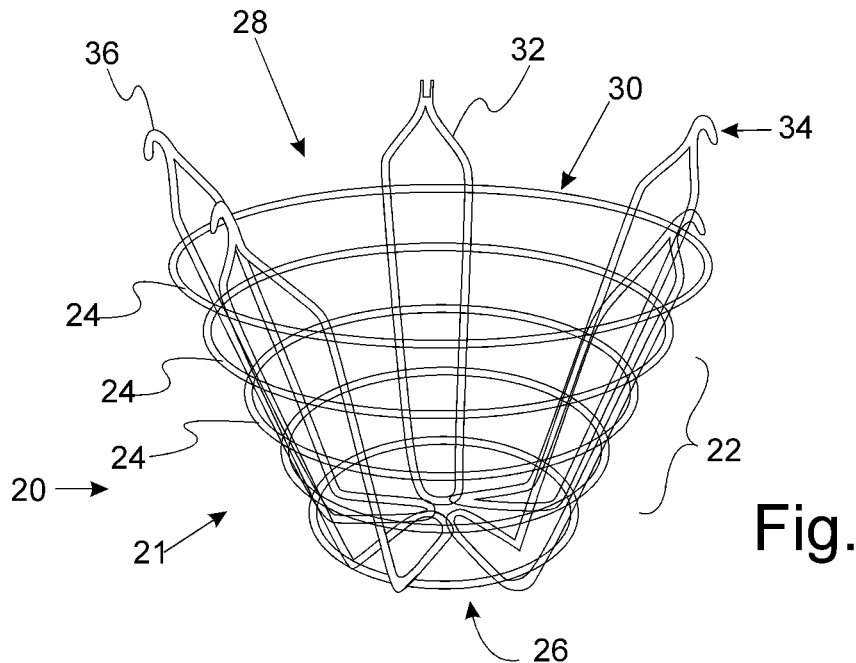
FIG. 2 shows a perspective view detailing the novel wire basket.

Referring to FIGS. 1A and 2, a wire basket 20 is formed from an open wire mesh 21. The wire basket 20 includes a bottom 26, a tapered sidewall 22 made from conically oriented horizontal wires 24 joined with a number of vertical wire loops 25, an open top 28, and a rim 30 located at the open top 28 comprising at least one of the conically oriented horizontal wires 24. The wire basket 20 also includes a plurality of projections 32 which extend from and beyond the rim 30 at the open top 28. The plurality of projections 32 are connected to the rim 30 and have a free end 34 whereat a hook 36 is disposed.

FIGS. 1A-1F show the sequential steps to securing the earth ball 39 of a plant 40 within a wire basket 20. The wire basket 20, preferably lined with burlap 37, which rests on its bottom 26 is ready to receive the earth ball 39 through the open top 28 unobstructed by the projections 32. Commonly a root digging machine 38 places the earth ball 39 within the wire basket 20, with the plant 40 being in a generally vertical position. The preferred burlap 37 is folded around the earth ball 39 and the trunk 35 of the plant 40. The burlap 37 is retained with a series of pins (not shown) in a conventional manner. A tensile member 41, such as twine or rope being distributed from a container 46, is tied around the trunk 35 of the plant 40 and additionally helps to secure the burlap around the earth ball 39 and the trunk 35 of the plant 40. The tensile member 41 can extend from the trunk 35 and be placed around the hooks 36 of the wire basket 20. The tensile member 41 is preferably strung around the hooks 36 in an optimal fashion so that upon tensioning the tensile member 41, the projections 32 begin to enclose the open top 28 of the wire basket 20 and secure the earth ball 39. At this point, the tensile member 41 can be tied off to itself, the wire basket 20, or the trunk 35 of the plant 40 to keep the projections 32 enclosed and the earth ball 39 secured. The wire basket 20 can be further tightened to take on the shape of the earth ball 39 through use of a tensioning apparatus 58 described further below. The tensioning apparatus 58 may draw wire away from the basket 20 and twist the wire to form closed loops 45 of wire.

Figure 3:
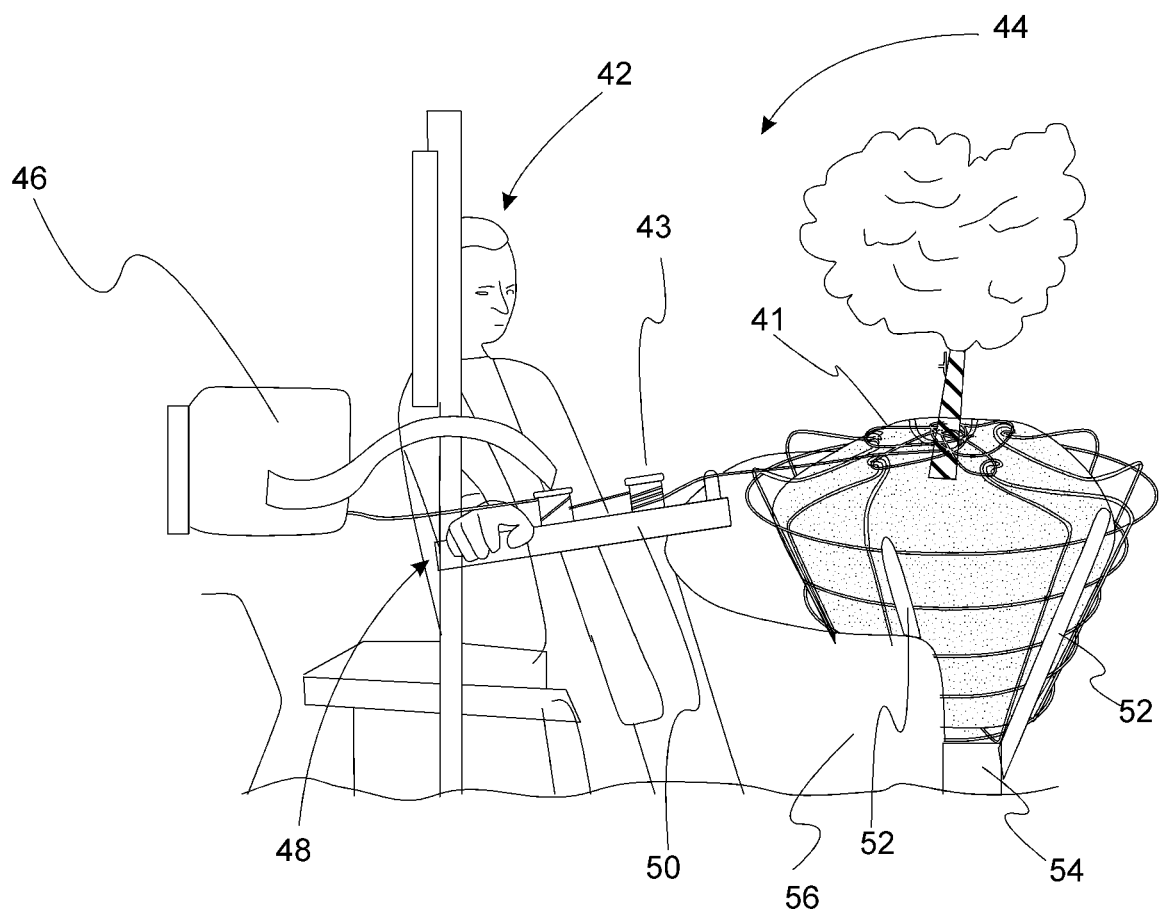
FIG. 3 shows a perspective view of the balling station and its components.

FIG. 3 depicts a balling station 44 to aid receiving and securing an earth ball 39 of a plant 40 in a wire basket 20 as mentioned above. The balling station 44 helps to automate the tree balling process and has a number of features which reduce the need for harsh physical labor. These utilities include a stand 54 having supports 52, a feeding arm 50 to distribute and tension the tensile member 41, an operator station 48, and a container 46 housing the tensile member 41.

An empty wire basket 20 ready to receive an earth ball 39 is placed onto the stand 54 having supports 52 which extend from the stand 54. The supports 52 are adjustable depending on the size of the wire basket 20 and the earth ball 39 of the plant 40. The supports 52 help to stabilize the wire basket 20 throughout the entirety of the tree balling process. The earth ball 39 of a plant 40 is placed into the wire basket 20 and is ready to be secured.

An operator 42 sitting at the operator station 48 adjacent to the stand 54 can easily fold the preferred burlap 37 around the earth ball 39 through selective use of a drive mechanism 100 which rotates the stand 54 and the earth ball 39. This rotational movement grants the operator 42 sitting at the operator station 48 access to the entire periphery of the wire basket 20. The drive mechanism 100 is better shown in FIG. 7B.

The balling station 44 in FIG. 3 is also equipped with a container 46, commonly containing a reel (not shown) of the tensile member 41. The tensile member 41, originating from the container 46, is distributed from a feeding arm 50 conveniently positioned adjacent to the operator station 48. The operator 42 may tie the tensile member 41 around and to the trunk 35 of the plant 40 as previously described. The tensile member 41 can easily be strung about the hooks 36 on the wire basket 20 using the feeding arm 50 as a guide. The feeding arm 50 also maintains line tension in the tensile member 41 so as to tighten the tensile member 41 as the operator 42 selectively rotates the stand 54 and the wire basket 20 containing the earth ball 39. The feeding arm 50 may tension the tensile member 41 through friction caused by wrapping the tensile member 41 around a column 43 several times. The column 43 is placed at a location between the container 46 and the distributing end of the feeding arm 50. The combination of rotating the wire basket 20 and tensioning the tensile member 41 about the hooks 36 causes the projections 32 to enclose the open top 28 of the wire basket 20 and secure the earth ball 39.

The operator station 48, capable of swiveling, is protected from potentially harmful objects by a shield 56 located between the operator station 48 and the stand 54. The balling station 44 also includes amenities for unloading the plant 40 with its earth ball 39 secured in the wire basket 20. A tilt mechanism 108 for lowering and tilting the stand 54 to rest the earth ball 39 and wire basket 20 on the earth is better shown in FIG. 7C. The supports 52 stabilize the plant 40 and the wire basket 20 all the while; prior to receiving the earth ball 39, during securement of the burlap 37 and wire basket 20 around the earth ball 39, and throughout tilting and lowering motions involved in unloading the plant 40.

Another embodiment of the present invention involves using the wire basket 20 without the aid of the balling station 44. After an earth ball 39 is placed into the wire basket 20 and burlap 37 is preferably folded around the earth ball 39, a tensile member 41 can quickly be laced about the hooks 36. The projections 32 extending from the wire basket 20 can easily be deformed by an operator 42 providing reasonable tension to the tensile member 41.

After enclosing the open top 28 of the wire basket 20 around the earth ball 39, an opportunity to further tighten the wire basket 20 around the earth ball 39 commonly exists. The tighter the wire basket 20 remains around the earth ball 39 while transporting the earth ball 39, the more intact the earth ball 39 will remain which further promotes a successful transplantation.

Figure 4:
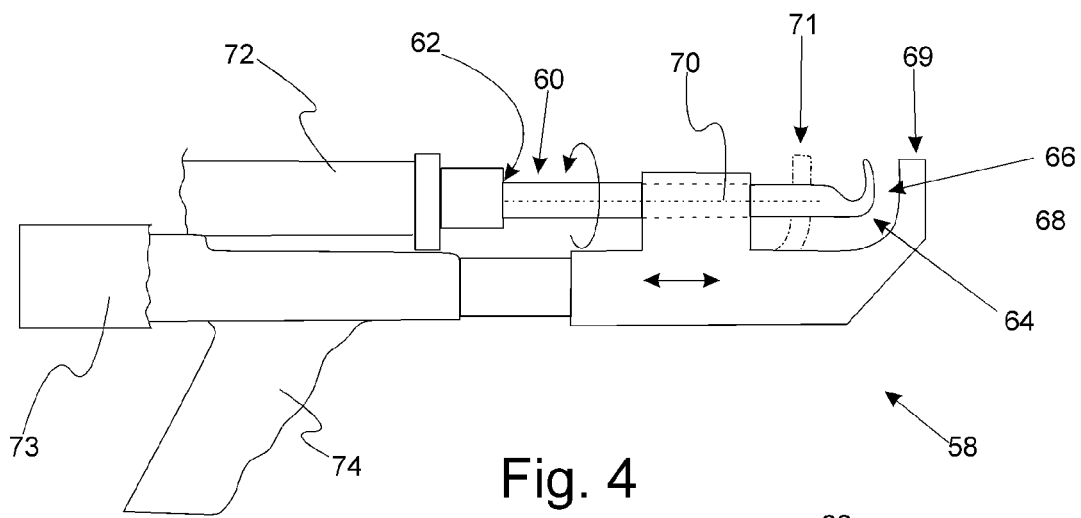
FIG. 4 shows a side view of the tensioning apparatus used for tightening the wire basket around a plant root ball.

FIG. 4 illustrates a tensioning apparatus 58 for providing this additional tightening to better preserve the earth ball 39. The tensioning apparatus 58 is shown in a retracted inboard position 69 wherein a wire guide 68 extends beyond a notch 66. The notch 66 is located at the free end 64 of a drive member 60. The drive member 60 additionally has a driven end 62 which is driven by a rotary driver 72. The tensioning apparatus 58 is alternatively capable of an extended outboard position 71 wherein the notch 66 extends beyond the wire guide 68. A linear actuator 73 is responsible for this relative movement occurring between the notch 66 and the wire guide 68 in order to achieve the retracted inboard position 69 and the extended outboard position 71. Additionally, at least one handle 74 and one control (not pictured) may be present in order to selectively control various functions and maneuver the tensioning apparatus 58.

Another embodiment exists in which the linear actuator 73 displaces the notch 66 as opposed to the wire guide 68.

Figure 6A:
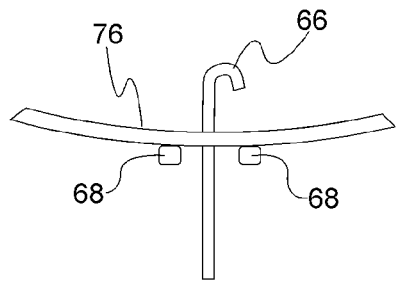
FIG. 6 shows a top view of the tensioning process involving the wire segment and the hook on the tensioning apparatus.
Figure 6C:
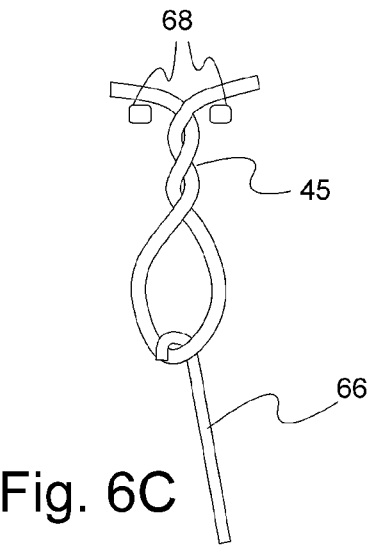
Figure 6B:
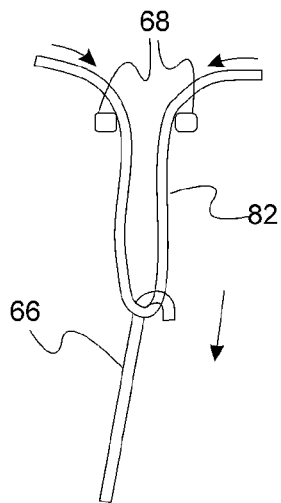
Figure 6D:
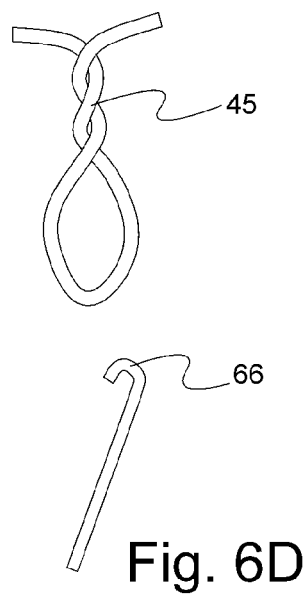
Figure 5A:
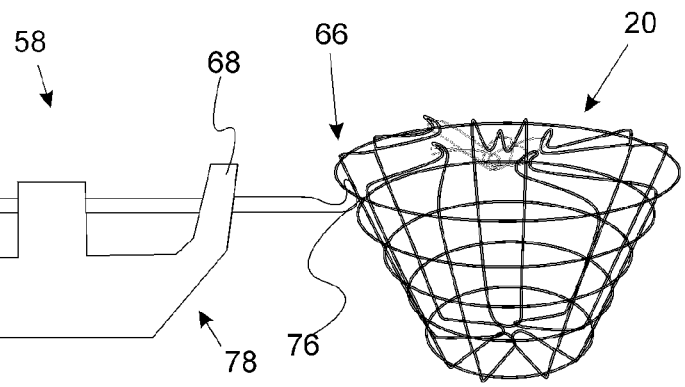
FIGS. 5A-5D show a side view of the tensioning process involving the tensioning apparatus and the segment of the wire basket to be tensioned.
Figure 5B:
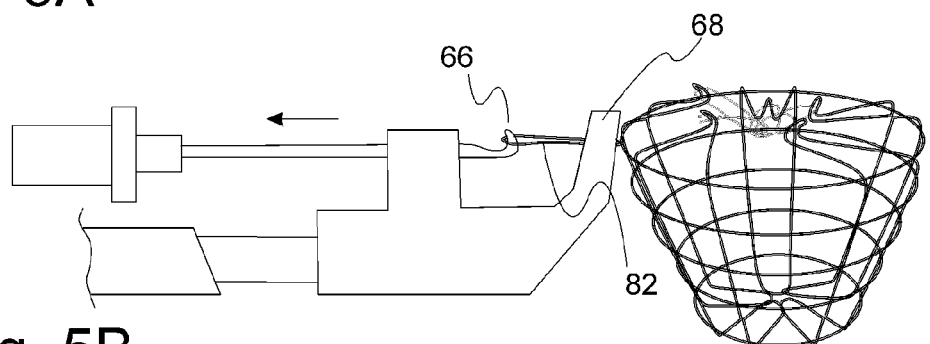
Figure 5C:
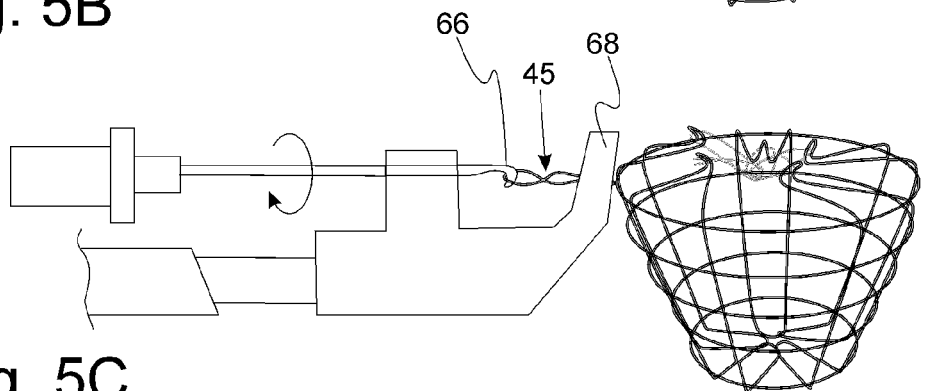
Figure 5D:
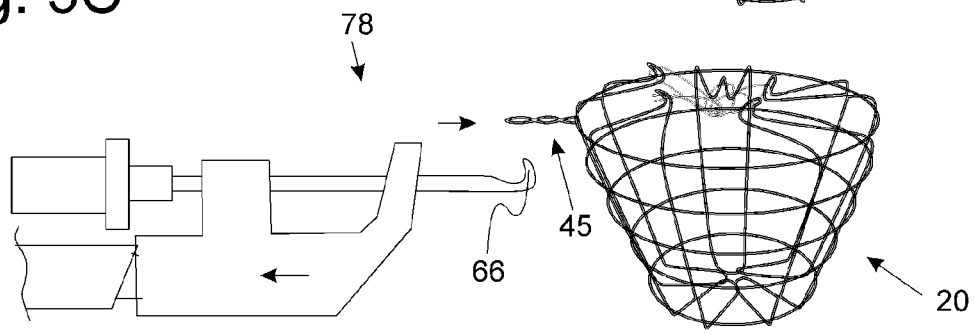

FIGS. 5A-5D show the side views of the core tensioning process. These views correspond with FIGS. 6A-6D's top view close-up of the same process. The tensioning apparatus 58 grasps the wire basket 20 by achieving the extended outboard position 71, shown in FIG. 5A, and placing the notch 66 behind a segment of wire to be tensioned 76, shown in FIG. 6A. The tensioning apparatus 58 draws the segment of wire to be tensioned 76 outward from the wire basket 20 by bringing the notch 66 inboard of the wire guide 68, seen in FIG. 5B. This relative movement between the notch 66 and the wire guide 68 creates an elongated U-shaped loop 82 which can be seen in FIG. 6B. The wire guides 68 continue to hold portions of the wire basket 20 in place while this shift to the retracted inboard position 69 occurs. Drawing wire away from the wire basket 20 decreases the circumference of the conically oriented horizontal wires 24 and tightens the wire basket 20 around the earth ball 39. Maintaining the retracted inboard position 69 with the segment of wire to be tensioned 76 still engaged with the notch 66, the rotary driver 72 rotates the drive member 60 about its central drive axis 70. This rotational motion, shown in FIG. 5C, also rotates the free end 64 and the notch 66 disposed thereon. Rotation of the notch 66 deforms the elongated U-shaped loop 82. This deformation forms the closed loop 45 shown in FIG. 6C. Deforming the elongated U-shaped loop 82 into the closed loop 45 further tightens the wire basket 20 around the earth ball 39. The twisted structure of the closed loop 45 prevents loosening of the wire basket 20 around the earth ball 39. The closed loop 45 on the wire basket 20 is ready to be released. The tensioning apparatus 58 shifts back to the extended outboard position 71 in which the notch 66 extends beyond the wire guide 68, shown in FIG. 5D. Again, this motion is delivered by the linear actuator 73. This position permits unhooking of the closed loop 45 as seen in FIG. 6D.

Other embodiments exist in which the tensioning apparatus 58 is used for purposes other than tree balling or in locations other than the balling station 44. Consider an agricultural application in which a farmer may need to tighten a wire enclosure containing produce or livestock feeding bales.

Figure 7A:
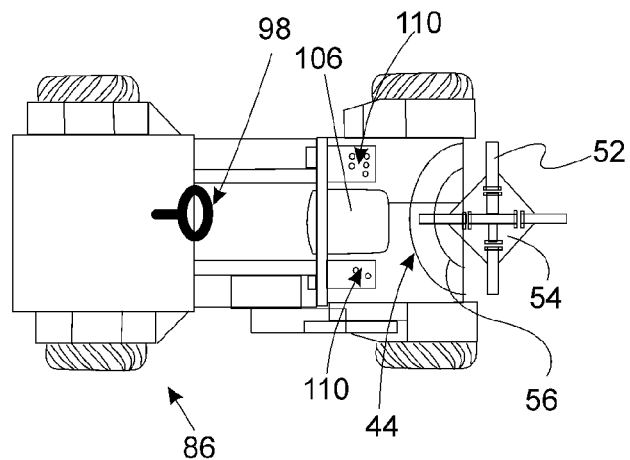
FIGS. 7A-7C show top and side views of a transportable device on which the balling station is preferably located. This figure depicts both an upright position for wrapping the earth ball and an unload position wherein a plant is rested on the earth.
Figure 7B:
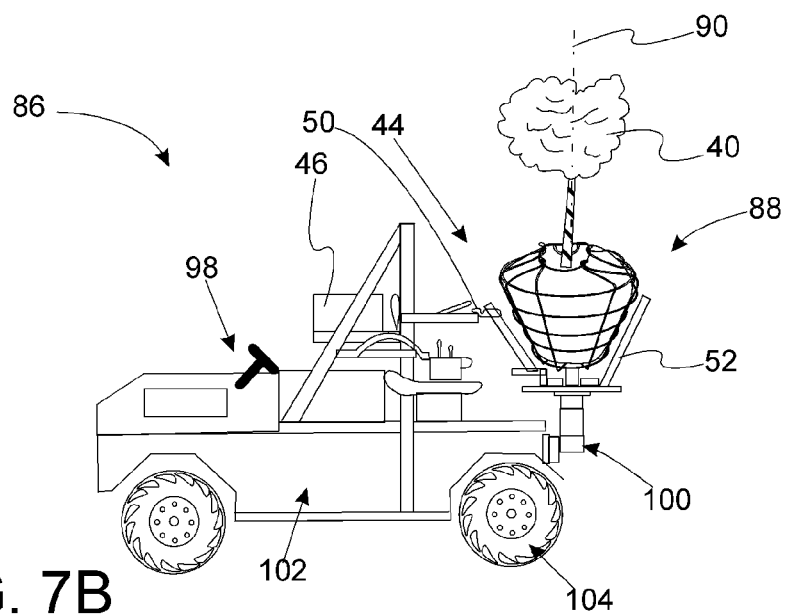
Figure 7C:
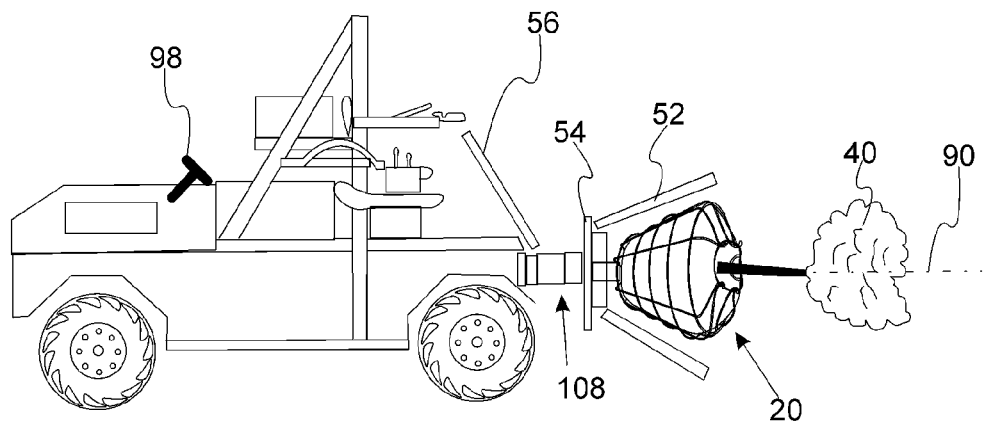

FIG. 7 shows a, preferably self propelled, transportable device 86 including wheels 104 and a frame 102. The transportable device 86 is helpful for carrying the balling station 44 and making the tree balling equipment more versatile. FIG. 7A better details the swivel chair 106 and operator controls 110 as part of the operator station 48. The swivel chair 106 is very convenient for providing access to both an optional driver cockpit 98 and utilities of the balling station 44. The optional driver cockpit 98 and swivel chair 106 are ideal if the transportable device 86 needs to commute to the transplantation site or carry the plant 40 various distances. A side view of the transportable device 86 having a balling station 44 loaded with a wire basket 20 and a plant 40 can be seen in FIG. 7B. This figure shows the plant 40 being in a nominally upright position 88 and having a generally vertical axis 90. FIG. 7B better depicts the drive mechanism 100 used for rotating the stand 54 which supports the wire basket 20, the earth ball 39, and the plant 40. The plant 40, its earth ball 39, and the accompanying wire basket 20 need to be unloaded after the earth ball 39 is secured within the wire basket 20. FIG. 7C shows an unload position 92 wherein a tilt mechanism 108 has tilted the plant 40 to have a tipped generally vertical axis 90. The supports 52 extending from the stand 54 help to stabilize the wire basket 20 and the wrapped earth ball 39 during this motion. The wire basket 20 and earth ball 39 are gently rested on the earth ready for their subsequent relocation.

Another embodiment exists wherein the stand 54 and the wire basket 20 are lowered preferably in combination with the motion provided by the tilt mechanism 108.

FIG. 8 displays a top view of a hook forming apparatus 112 used commonly for creating hooks on wire baskets 20. The hook forming apparatus 112 has a grasping mechanism 114 connected to a free end 117 of a shaft 116. The shaft 116 also has a driven end 118 which is driven fore and aft by an actuator 120. The hook forming apparatus 112 also features a die 126 sized for clearance by the grasping mechanism 114. A slot 128, for guiding a removable pin 124 placed perpendicular to the shaft 116, extrudes through the structure of the die 126. A locating pin 122 is also placed perpendicular to the shaft 116. A track 123 is disposed between the shaft 116 and the grasping mechanism 114. The track 123 communicates with a fixed roller 125 as described below.

FIGS. 9A-9D and 10A-10D show the wire hook forming apparatus 112 and a corresponding wire hook perspective as a wire hook is formed. The grasping mechanism 114, protruding beyond the die 126 as seen in FIG. 9A, is placed behind a wire projection 32 of a conventional wire basket similar to that of FIG. 10A. The actuator 120 retracts the shaft 116, seen in FIG. 9B, causing for the grasping mechanism 114 and the piece of wire to be pulled through the die 126. The die 126, being stronger than the piece of wire 130, deforms the piece of wire 130 into a stretched segment 132 seen in FIG. 10B. This retracting motion is stopped by a locating pin 122 which selectively communicates with the shaft 116. The removable pin 124 is inserted into the slot 128 near the die 126 and the actuator 120 may extend the shaft 116. The sloped surface 115 on the back of the grasping mechanism 114 is angled so that the grasping mechanism 114 and the stretched segment 132 are forced up and over the removable pin 124 when the actuator 120 extends the shaft 116. This step is seen in FIG. 9C while the accompanying partial wire hook 134 can be seen in FIG. 10C. As the actuator 120 continues to extend the shaft 116 and the grasping mechanism 114 with the partial wire hook 134, the track 123 is engaged with the fixed roller 125 forcing the grasping mechanism 114 downwards and over the removable pin 124. This motion can be seen in FIG. 9D while the hook 36 can be seen in FIG. 10D. The removable pin 124 is removed from the slot 128 in the die 126 to permit removal of the hook 36.

Another embodiment exists wherein the hook forming apparatus 112 is utilized to create hooks along segments of wire besides those defining the previously described wire basket 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A balling station for securing an earth ball of a plant to be transplanted in a wire basket, the balling station comprising:
 a stand for receiving and supporting the wire basket for securely surrounding the earth ball of a plant to be transplanted, the stand positioned in a nominally upright position and capable of rotating the wire basket with the earth ball of a plant deposited therein about a generally vertical central axis;
 an operator station connected to the stand;
 a powered drive mechanism to selectively rotate the stand about a generally vertical axis relative to the operator station, enabling an operator to secure the wire basket about the earth ball; and
 a powered tilt mechanism for moving the stand between the nominally upright position having the generally vertical-central axis and an unload position in which the generally vertical central axis has been tipped sufficiently toward a horizontal position for removing the earth ball and the secured wire basket from the stand.

2. The balling station of claim 1, wherein the operator station has a movable feeding arm used to distribute a tensile member, wherein the tensile member helps secure the wire basket about the earth ball.

3. The balling station of claim 2, wherein the operator station has a container which houses the tensile member on a reel prior to deliverance to the movable feeding arm.

4. The balling station of claim 3, wherein the tensile member is configured to wrap around a column disposed on the feeding arm between the container and a distributing end of the feeding arm to cause tensioning in the tensile member when securing the wire basket about the earth ball.

5. The balling station of claim 1 further comprising a self-propelled transportable frame having the stand, the operator station, the drive mechanism, and the tilt mechanism onboard.

* * * * *